Patented July 9, 1929.

1,720,565

UNITED STATES PATENT OFFICE.

JOHN H. OBERHOLTZER, OF HARRISBURG, PENNSYLVANIA, ASSIGNOR OF ONE-HALF TO ROBERT C. MURPHY, OF HARRISBURG, PENNSYLVANIA.

INCRUSTATION PREVENTIVE.

No Drawing. Application filed July 10, 1926. Serial No. 121,739.

The present invention relates to a composition to be used in connection with the water used in steam boilers for generating steam for the purpose of preventing the accumulation and facilitating the removal of scale or incrustations. Among the objects of the invention is the production of a compound which can be used effectively even by inexperienced persons with certain and satisfactory results. Another object of the present invention consists in the production of a composition which is not only very efficient and rapid in operation, but which is very cheap and simple to produce. A further object of the invention is the production of a composition which will not only be useful as a boiler incrustation preventive and a means for facilitating the removal of scale or incrustation, but will also function as a paint and varnish remover from wood, metal etc., but preferably from metal, from which latter it removes the paint coat without substantially any action upon the metal.

In preparing the above referred to composition having the properties and characteristics indicated, use is made of the following ingredients or substances in substantially the proportions indicated:

Starch, preferably Argo gloss starch_____ ½ to 5 lbs.
Lye, such as sodium or potassium hydroxide_____ 1 to 5 lbs.
Decayed or rotten wood_____ ½ to 5 bu.
Water _____ 20 to 100 gal.

although I prefer to use 1 pound of starch, 1 pound of lye, ½ bushel of decayed wood and approximately 20 gallons of water. In preparing the composition the decayed or rotten wood is broken into small sizes and allowed to soak in the water until the water is appreciably colored. This may require about a day. The lye is then added and the mixture is thoroughly agitated and allowed to stand for another day. At this stage the liquor has turned to be a dark brown color. The starch is now gradually added while the whole is thoroughly mixed. After allowing sufficient time for the starch to be thoroughly incorporated, the prepared composition may be dipped from the mixing vat in order to free it from floating particles of wood or decayed wood which have not been taken up by the composition. Of course the removal of such particles or parts of wood or unused decayed wood may be accomplished by screening, filtering or otherwise.

The composition may also be prepared in the dry form by admixing decayed wood, with alkali and starch in the above proportions, without the addition of water, and thoroughly grinding them to a powder; or the dry powdered or pulverized ingredients may be thoroughly admixed after they have been individually reduced to a fine state. The dry composition so prepared may be either directly admixed with the boiler water or may be preliminarily admixed with a small proportion of water and thereafter admixed with the main body of boiler water.

In using the composition I find it advantageous to use about one gallon of the liquid composition prepared as above described to about six hundred gallons of water, although it is to be understood that the amount of the composition used depends largely upon the character of the particular water being used in the boiler.

The composition prepared as described in addition to accomplishing the objects and functions recited above is substantially non-irritating to the skins of the hands and thus is very desirable for use as a paint remover.

Having described my invention, what I claim is:

1. A composition of matter suitable for use in removing and preventing incrustations in boilers comprising starch, a hydroxide of an alkali metal and decayed wood in substantially the following proportions, starch ½ to 5 pounds, hydroxide of an alkali metal 1 to 5 pounds, decayed wood ½ to 5 bushels.

2. A composition of matter for use in removing and preventing incrustations in boilers consisting of the following in substantially the proportions named: starch ½ to 5 pounds and a solution consisting of 1 to 5 pounds of a hydroxide of an alkali metal in 20 to 100 gallons of water, in which solution ½ to 5 bushels of decayed or rotted wood have been digested.

In testimony whereof I affix my signature.

JOHN H. OBERHOLTZER.